US011330050B2

(12) United States Patent
Zavesky et al.

(10) Patent No.: US 11,330,050 B2
(45) Date of Patent: *May 10, 2022

(54) EDGE SHARING ORCHESTRATION SYSTEM

(71) Applicant: AT&T Intellectual Property I, L.P., Atlanta, GA (US)

(72) Inventors: Eric Zavesky, Austin, TX (US); Nigel Bradley, McDonough, GA (US); David Crawford Gibbon, Lincroft, NJ (US); Timothy Innes, Atlanta, GA (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/930,829

(22) Filed: Jul. 16, 2020

(65) Prior Publication Data

US 2020/0351340 A1 Nov. 5, 2020

Related U.S. Application Data

(63) Continuation of application No. 16/002,579, filed on Jun. 7, 2018, now Pat. No. 10,742,728.

(51) Int. Cl.
*H04L 29/08* (2006.01)
*H04L 67/1074* (2022.01)
(Continued)

(52) U.S. Cl.
CPC ...... *H04L 67/1076* (2013.01); *H04L 67/1046* (2013.01); *H04L 67/1068* (2013.01)

(58) Field of Classification Search
CPC ............ H04L 67/1076; H04L 67/1046; H04L 67/1068
See application file for complete search history.

(56) References Cited

U.S. PATENT DOCUMENTS 8,868,763 B2 10/2014 Tedesco et al.
9,722,815 B2 8/2017 Mukundan et al.
(Continued)

FOREIGN PATENT DOCUMENTS

WO 2018009159 A1 1/2018

*Primary Examiner* — El Hadji M Sall
(74) *Attorney, Agent, or Firm* — Guntin & Gust, PLC; John G. Rauch

(57) ABSTRACT

A network device includes a processor and a memory. The processor effectuates operations including instantiating an edge share orchestrator that identifies edge devices including a customer device. Edge share orchestrator also determines that the customer device lacks computing power or functionality to perform at least a portion of an existing or augmented service and identifies at least one additional device of the edge devices capable of providing additional computing power or functionality for performing the at least a portion of the existing service or augmented service associated with the customer device. Edge share orchestrator also meshes the additional computing power or functionality of the at least one additional device with the customer device and performs the at least a portion of the existing or augmented service associated with the customer device using the meshed additional computing power or functionality of the at least one additional device and the customer device.

20 Claims, 13 Drawing Sheets

(51) Int. Cl.
    *H04L 67/1042*    (2022.01)
    *H04L 67/1061*    (2022.01)

(56) References Cited

U.S. PATENT DOCUMENTS

| | | | |
|---|---|---|---|
| 9,832,170 | B2 | 11/2017 | Bharadhwaj et al. |
| 2006/0209682 | A1* | 9/2006 | Filsfils ............... H04L 45/28 370/219 |
| 2011/0286456 | A1* | 11/2011 | Kompella ........... H04L 41/084 370/390 |
| 2013/0194911 | A1* | 8/2013 | Fedyk ............... H04L 43/0811 370/217 |
| 2013/0219423 | A1 | 8/2013 | Prickett et al. |
| 2014/0099938 | A1 | 4/2014 | Calo et al. |
| 2015/0092593 | A1* | 4/2015 | Kompella ............ H04L 49/25 370/254 |
| 2016/0140359 | A1 | 5/2016 | Mukherjee et al. |
| 2017/0048308 | A1 | 2/2017 | Qaisar |
| 2017/0155710 | A1* | 6/2017 | Quinn ................. H04L 67/10 |
| 2017/0237814 | A1 | 8/2017 | Zhang |
| 2017/0272342 | A1 | 9/2017 | Zessin et al. |
| 2017/0366472 | A1 | 12/2017 | Byers et al. |
| 2018/0041578 | A1 | 2/2018 | Lee et al. |
| 2018/0097876 | A1 | 4/2018 | Rolia et al. |

\* cited by examiner

EDGE SHARING ORCHESTRATION SYSTEM

CROSS REFERENCE TO RELATED APPLICATIONS

This application is a continuation of, and claims priority to, U.S. patent application Ser. No. 16/002,579, filed Jun. 7, 2018, entitled "Edge Sharing Orchestration System," the entire contents of which are hereby incorporated herein by reference.

TECHNICAL FIELD

The invention relates to networked resources, and more particularly to a system that coordinates edge resources to enhance computing power and network services. Most particularly, the system identifies and registers edge devices and meshes a capability or function of the edge devices with a customer device to provide a novel or augmented service.

BACKGROUND

Wrapped in neutral toned polymer sheaths lies the untapped potential of past computing power. Perhaps the victim of a marketing technique of constantly releasing incrementally better devices and the cold dispatch of an increasingly disposable attitude toward technology, society has created a dearth of unused devices. Personal computers, screens, last year's phone, video games, electronic toys and other devices that have processing power, a display, a speaker, or haptic output. These devices, which once held the full attention of their users, have been neglected amid the tide of progress. Picture the island of unwanted toys existing in closets, shelves, and drawers throughout the world. Discarded for a newer model, a bigger screen, the latest trend or a cracked facade, these devices may still possess compute power or other untapped resources. While there are efforts to recycle these devices, strip them of the rare earth metals decorating their sea green wafer-like innards, there is a need to realize their potential through a more direct method.

The family media node is in metastasis where the differences between television, media player and personal computer seem particularly arbitrary. The proliferation of software defined networks (SDN) and internet of things (IoT) is expected to further blur the roles of various devices. Nevertheless, it is also expected that manufacturers will continue to differentiate themselves in terms of the role, import and capabilities of their devices. Again, this differentiation causes users to focus on certain devices for certain purposes. The potential of leveraging the capability of various devices within a local area is overlooked. As a result, there is a need to inventory these capabilities and deliver them as needed or desired in support of the user experience.

This disclosure is directed to solving one or more of the problems in the existing technology.

SUMMARY

The present disclosure is directed to a device having a processor and a memory coupled with the processor. The processor effectuates operations including instantiating an edge share orchestrator, in which the edge share orchestrator effectuates operations including identifying edge devices, wherein the edge devices comprise a customer device. The edge share orchestrator further effectuates operations including determining that the customer device lacks computing power or functionality to perform at least a portion of an existing or augmented service. The edge share orchestrator further effectuates operations including identifying at least one additional device of the edge devices capable of providing additional computing power or functionality for performing the at least a portion of the existing service or augmented service associated with the customer device. The edge share orchestrator further effectuates operations including meshing the additional computing power or functionality of the at least one additional device with the customer device. The edge share orchestrator further effectuates operations including performing the at least a portion of the existing or augmented service associated with the customer device using the meshed additional computing power or functionality of the at least one additional device and the customer device.

The present disclosure is directed to a computer-implemented method. The computer-implemented method includes identifying, by a processor, edge devices, wherein the edge devices comprise a customer device. The computer-implemented method further includes determining, by the processor, that the customer device lacks computing power or functionality to perform at least a portion of an existing service or augmented service. The computer-implemented method further includes identifying, by the processor, at least one additional device of the edge devices capable of providing additional computing power or functionality for performing the at least a portion of the existing service or augmented service associated with the customer device. The computer-implemented method further includes meshing, by the processor, the additional computing power or functionality of the at least one additional device with the customer device. The computer-implemented method further includes performing, by the processor, the at least a portion of the existing service or augmented service associated with the customer device using the meshed additional computing power or functionality of the at least one additional device and the customer device.

The present disclosure is directed to a system having a processor and a memory coupled with the processor. The processor effectuates operations including identifying edge devices, wherein the edge devices comprise a customer device. The processor further effectuates operations including determining that the customer device lacks computing power or functionality to perform at least a portion of an existing service or augmented service. The processor further effectuates operations including identifying at least one additional device of the edge devices capable of providing additional computing power or functionality for performing the at least a portion of the existing service or augmented service associated with the customer device. The processor further effectuates operations including meshing the additional computing power or functionality of the at least one additional device with the customer device. The processor further effectuates operations including performing the at least a portion of the existing service or augmented service associated with the customer device using the meshed additional computing power or functionality of the at least one additional device and the customer device.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Edge resources including user devices including but not limited to personal computers, set top boxes, gaming system, handheld video games, audio/visual systems; smart appliances, televisions; telephones, personal digital assistants, tablet computers, internet of things devices and the like are often idle. When idle, these resources can provide computing power and/or network services. A portion of these devices are completely unused and simply take up space while their user contemplates disposal. With the proliferation of smart devices that have the ability to communicate with a network, the number of idle devices is expected to increase. The proposed system coordinates the edge resources to make more with less. Rather than requiring a user to purchase a new device to provide capabilities needed for a desired application, the edge orchestration system 200 enhances a current devices capability by pulling needed resources or producing needed capability from connected devices. For example, sharing bandwidth, processing power, or memory/storage. The system includes an edge share orchestrator that is configured to identify resources and use them for an appropriate function. The resources may be on idle devices or active devices. The system is also configured to mediate sharing devices in a community modulating the amount of device capability shared and accommodating opt-in/opt-out capability. The system may define a reciprocal relationship where users that opt-in to provide more capability have access to greater bandwidth/ compute power as a result. The system could also allow the user to provide an input to limit the use of their shared resources according to a user defined policy. For example, a user policy may limit shared use to a particular community, particular users, or to particular devices. According to an example, the system provides a framework that is secure and open to extension that provides cohesive computing and network resources. This framework can also establish a social network of resource sharing communities and allow collection of data on behavior of the resource sharing community (backend service).

As described in more detail below, edge orchestrator system assembles resources on a network. The network may include a telecommunications network, software defined network, local area network, and the like. Examples of various networks are provided in connection with FIGS. 4-10 and described below. The edge orchestration system 200 in the following description may be implemented within one or more of the various networks including but not limited to centralized communications networks, peer to peer networks, and local networks. Moreover, as discussed more completely below, system 200 may be instantiated as a network device within such networks or a virtual network function on a network.

Figure 1A:
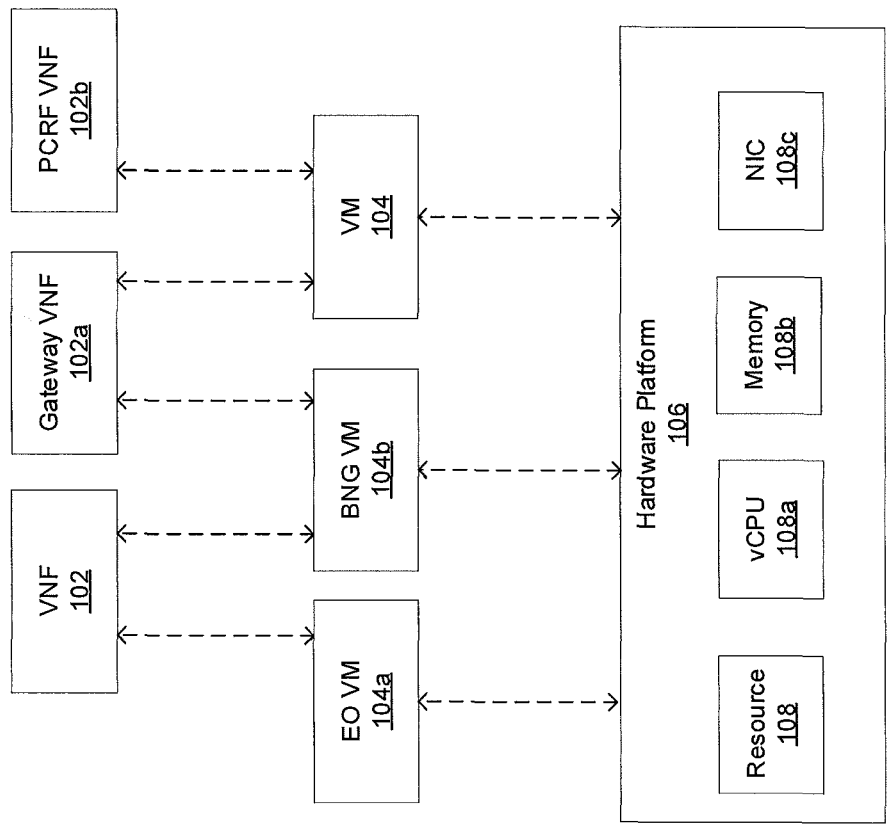
FIG. 1a is a representation of an exemplary network.

FIG. 1A is a representation of an exemplary network 100. Network 100 may comprise a software defined network or SDN, for example, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs including but not limited to security, routing, wide area network (WAN) optimization and others within a service providers virtual network offerings. According to the example, VNF 102 may estimate a buffer condition as described more completely below.

Each VNF 102 may use one or more virtual machine (VM) 104 to operate. Each VM 104 may have a VM type that indicates its functionality or role. For example, FIG. 1A illustrates an edge orchestrator (EO) VM 104a and a broadband network gateway (BNG) VM 104b. Additionally or alternatively, VM 104 may include other types of VMs. Each VM 104 may consume various network resources from a hardware platform 106, such as a resource 108, a virtual central processing unit (vCPU) 108a, memory 108b, or a network interface card (NIC) 108c. Additionally or alternatively, hardware platform 106 may include other types of resources 108.

Figure 1B:
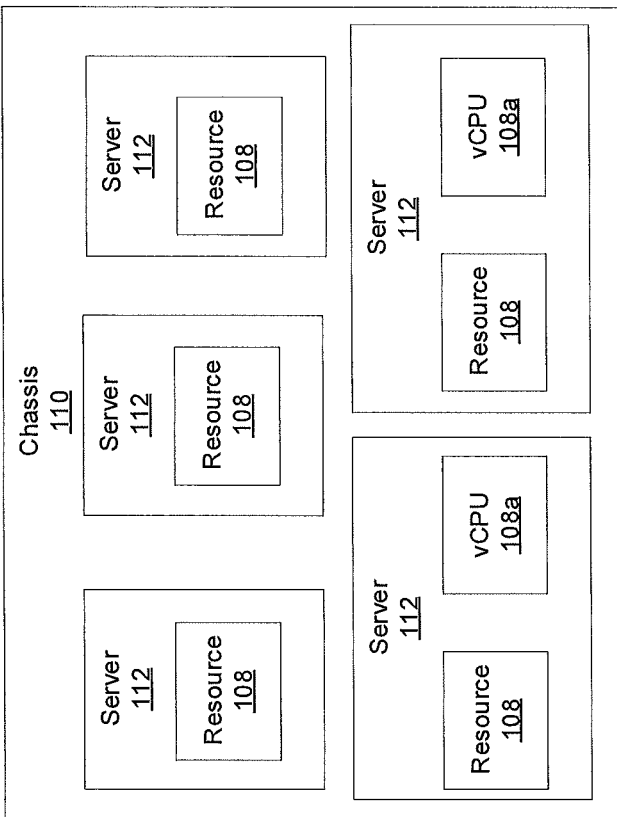
FIG. 1b is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chassis 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
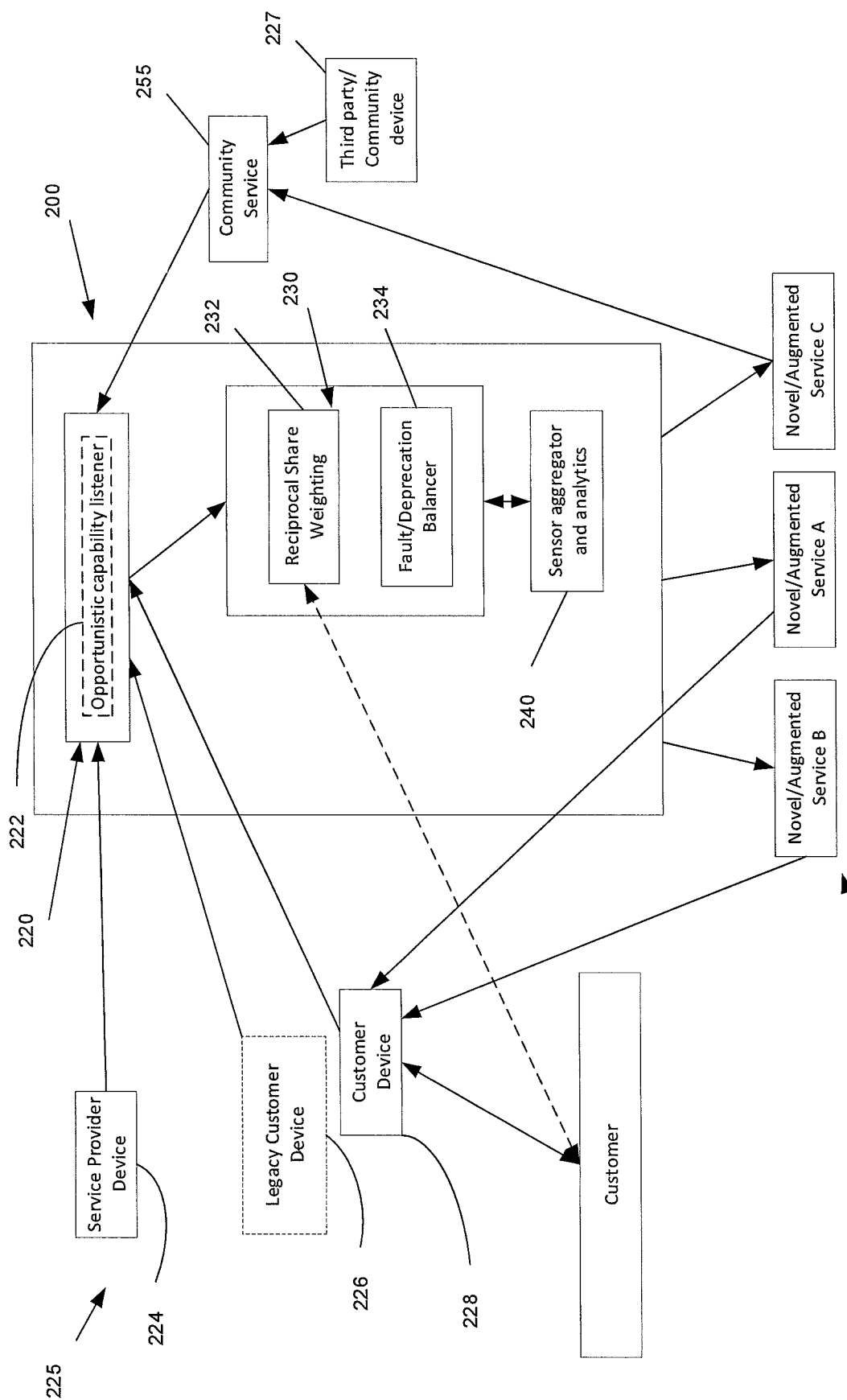
FIG. 2 is a representation of an edge sharing orchestrator system according to an example.
Figure 2A:
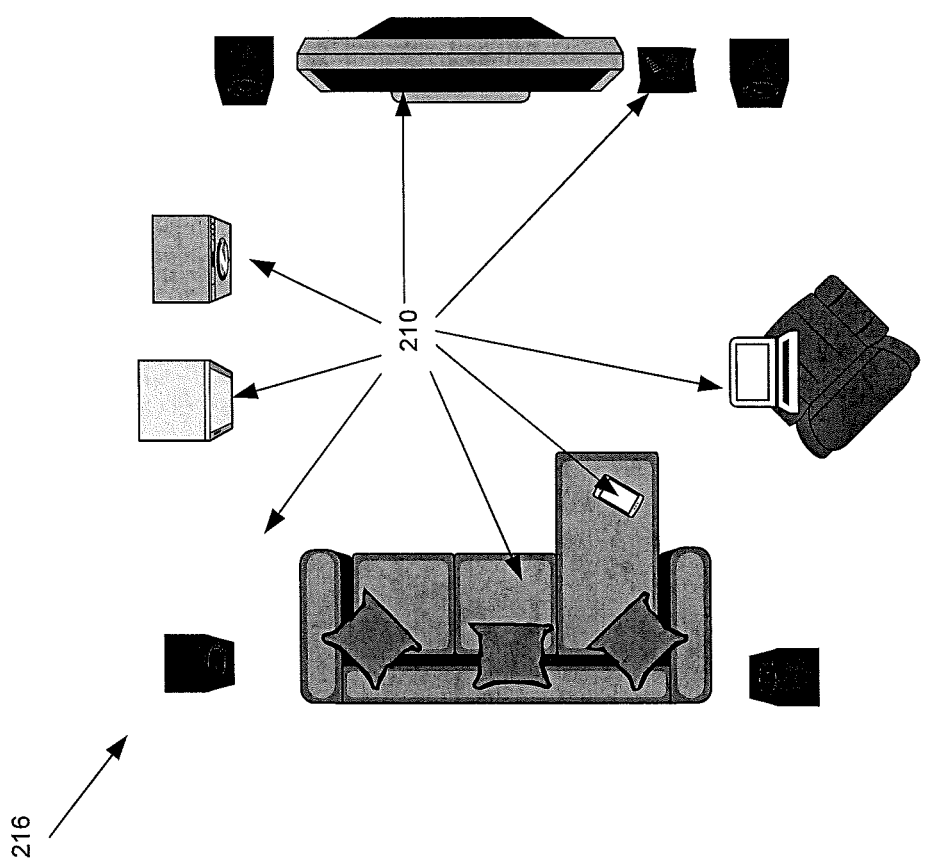
FIG. 2A is a representation of an edge sharing orchestrator operating within a local environment that includes multiple devices.

FIG. 2A depicts one example of an edge sharing orchestrator system, generally indicated at 200. In the example, system 200 manages the needs and capabilities for edge devices, generally indicated by the number 210. A number of exemplary edge devices 210 are depicted within a location 216. It will be understood that location 216 is arbitrary and may be any area where edge devices 210 physically reside. Location 216 may also include a virtual location in the sense of plural devices that have been grouped within a community by agreement or other affiliation. In the example, location 216 is depicted as a residence having plural edge devices 210 including computing devices, such as laptop computers; a smart phone; smart appliances, such as a refrigerator and dishwasher; television; set top box; stereo system with blue tooth speakers; and connected couch. These examples are not limiting, and additional edge devices may be found in the residence or other location 216. For example, in an office setting other edge devices may include an imaging machine, printers, and the like. Location 216 may also include a community of devices that are grouped by an agreement or other affiliation. One example may be device users that subscribe to a common provider, such as AT&T, that opt-in to a resource sharing pool as part of their subscription or separate opt-in provisions. Other communities of devices that are joined virtually may be defined, and opt-in provisions may be provided on-demand to increase functionality or capacity using system 200 as described more completely below.

The system 200 recognizes that users tend to view devices on individual merit and capability and not in a generic building block sense. The system 200, however, meshes functionality and capability to create a patchwork quilt of capability from the disparate sources at hand. In one example, system 200 leverages devices in a limited location i.e. in a building, small geographical location, defined computing community, and the like. In other examples, the system leverages devices from a broader geographical area. In a further example, system facilitates selective participation to share resources, such as in community resources, as will be described more completely below.

The system 200 offers greater capability by pooling resources from one or more devices. The capability may be to address a need for additional computing power or functionality not realized in a single device or group of devices currently employed by a user. In general, system 200 may combine resources with a customer device to provide a novel or augmented service. The novel service may be a capability not currently available on the customer device. An augmented service may be enhancing a capability or function that currently exists on the customer device. As an example of an augmented service, a user may require additional computing power or display capacity for an entertainment console to play a new game. To address this problem without having to replace the existing console with a more powerful version, system 200 may identify additional resources within the user's residence that can supply the additional computing and display capacity required. In another example, the system 200 identifies additional resources outside of the residence including but not limited to community resources located nearby or further reaching resources that may be tapped to address the need for additional computing power and display capacity.

The capability may also be to provide a novel service, such as a unique functionality or combination of existing functionalities not realized by a customer's current device. One example may be combining functionality of IoT devices. For example, system may leverage the capabilities of an entertainment system with a smart massage chair to synchronize vibration of the chair with a movie played on the entertainment system to provide an enhanced movie viewing experience.

With reference to FIG. 2, edge orchestration system 200 generally includes an opportunistic capability listener, generally indicated by the number 220. Opportunistic listener 220 may be hosted on a single physical device or distributed across more than one physical device. Opportunistic capability listener 220 may include one or more network device, virtual machine, or virtual network function, collectively referred to as a listener device 222 that monitors one or more devices connected to a network 100. In the example, opportunistic capability listener 220 identifies one or more connected device, generally indicated by the number 225, including but not limited to a service provider device 224, a legacy customer device 226 and a customer device 228. Service provider device 224 may be a gateway, a router or similar device connecting the customer to the service provider. A legacy customer device 226 is a device not actively being used by the customer for a period of time. Thus, legacy customer device 226 may include a device that is idle on a permanent or temporary basis. The customer device 228, in the example, is an active device used by the customer. The connected devices 225 may also include third party owned devices 227, such as community devices discussed more completely below.

Opportunistic capability listener 220 may passively monitor a network waiting for an announcement when a connected device 225 is added to a network 100. Alternatively or in addition to passive monitoring, opportunistic capability listener 220 may actively ping the network to detect a connected device 225. Opportunistic capability listener 220 pools the connected devices 225 and their capability/function or data sources. Opportunistic capability listener 220 may include or be connected to memory to store information including at least one of an identifier, capability information and function information for each device discovered through announcement or active discovery. The opportunistic capability listener may optionally identify and log data sources available from device. Opportunistic capability listener 220 is available to communicate this information to edge orchestration system 200 on an active basis or in response to a query.

The process of identifying edge share devices may include registering each device to edge share orchestrator 210 as indicated by the arrows. Opportunistic capability listener 222 may also receive input from an outside orchestrator including but not limited to a community orchestrator 255, as shown, that analyzes usage patterns and reports. Community service orchestrator 255 may also facilitate connection of third-party devices 227.

Edge orchestration system 200 further includes an edge share load balancer, generally indicated by the number 230. Edge share load balancer or edge share balancer 230 integrates connected devices 225 and monitors connected devices 225 for consistency. Edge share load balancer 230 may include a share aggregator, such as the reciprocal share weighting module 232 shown, to allow a customer 215 to control or limit level of sharing and/or the amount of use of the customer device 228. As indicated by the dashed line, one or more input/output device associated with the customer device 215 and aggregator 232 permits customer device 215 to communicate a share limit signal that defines a share level, device participation limit or other policy for the use of the customer device 215.

Edge share load balancer 230 may also include a fault/deprecation balancer 234. The fault/deprecation balancer 234. The fault/deprecation balancer monitors connected devices 225 performance and operation status to provide consistent performance across the shared pool. Balancer 234 may detect device failures or performance degradation and report back to the edge share load balancer to account for such changes in device performance in the context of the desired novel or augmented service 250.

An analytics module, generally indicated by the number 240 may be provided. The analytics module may be a sensor aggregator and analytics virtual network function. Analytics module 240 may sample devices via orchestrator to aggregate sensor information as part of its analysis. As shown, analytics module 240 may communicate with edge share load balancer 230. Analytics module 240 aggregates sensor information from edge share load balancer 230 including but not limited to faults and depreciation information, balancing and customer-imposed limits. Analytics module 240 analyzes how disparate capabilities from edge devices are fitting together. Analytics module 240 can provide a recommendation to edge share load balancer 230 to modify use of one or more edge devices based on analytics. Such modification may include but is not limited to adding or removing a device, feature, capability, or input from shared use. In one example, analytics module may modify use of a legacy device, for example transferring its functionality to another device, if it determines that the use of legacy device causes customer device to operate less efficiently and draw down its battery at a rate that is deemed unacceptable by a customer imposed limit.

According to the example, edge share orchestrator system 200 is able to pool device capability, functions etc. in a topology agnostic manner. In one example, referred to as an output case, system 200 pools function or capability to provide enhanced service or capability through a customer device 228. This example starts with the premise that customer device 228 lacks function or capability to perform an existing service or to perform an augmented service not previously available on device 228. The lacking may be a temporary deficiency caused by use of resources for another task as well as an inherent deficiency in the device 228. For the example, the device 228 lacks compute power to provide a one or more augmented or novel service(s), generally indicated at 250. System 200 identifies other edge devices capable of providing the additional compute power to perform the service and pools an additional edge device(s) with device 228 to provide the service.

In an input case, system 200 may pool inputs from at least one additional device to provide augmented or novel service 250. For example, legacy device 226 may include a temperature sensor not available on a customer device 228. The augmented or novel service 250 may require this function. Orchestrator accesses and activates this input as needed to fulfill the augmented or novel service 250. It will be understood that other sensors or inputs on devices may be accessed via system 200. Moreover, reference to a legacy device is not limiting. In other examples, non-legacy devices including but not limited to IoT devices or other devices having various input capabilities are accessed by system 200.

It will be understood that the output and input cases may be combined depending on the desired service to be provided. It also will be understood that the novel/augmented service includes augmenting device capability to address deficiencies that may be the product of current device usage, damage to the device, peak saturation, and other losses of performance or quality of service issues. The orchestrator system 200 may also be used by the customer device 228 to provide capability or functions externally when the devices are idle. For example, when edge devices under common ownership are not being used to full capacity, the devices may be shared through orchestrator to provide augmented or novel service to a third party. This sharing of capacity may be freely given or controlled. In a controlled scenario, the device may be opted in through a signal on the device or membership of the device within a defined community. Control over resource use may include usage thresholds identified in the reciprocal share weighting module 232. For example, legacy devices 226 and customer devices 228 may be opted in but a threshold established on their usage, power consumption, or other threshold to limit usage once a threshold is reached or throttle/re-distribute usage as the threshold is approached.

System 200 may be operated as a virtual function within a community to provide community services, generally indicated at 255, including but not limited to common tasks, applications, or experiences to the community by pooling all of the devices within the community. As shown in the example in FIG. 2, a novel or augmented service C may be provided through pooling of resources to provide community service 255. Such community pooling may be to provide service options within a community such as the ability to share bandwidth, processing power, analytics, and storage. It may also be used to normalize service quality of service or experience performance including but not limited to normalizing frame rate, streaming capability, and the like between video endpoints as a community service 255. System 200 may also moderate sharing by automating opt-in and opt-out capabilities within the community.

One community may include a service provider defined community. In this example, system 200 allows service provider to upgrade service or provide better quality of service or performance based on the availability of pooled resources in the community. This has the ability to shorten upgrade request response time by using existing capability or function within the service provider community to initially address the request before requiring addition of a new device. Such features can be used to incentivize opt-in for sharing.

Community service orchestrator 255 may track sharing across devices and in some instances on a common ownership basis to account for the level of participation and use within a community or amongst other combinations of devices owned by separate customers. In addition, the analytics module may report usage for purposes of provisioning limits or remuneration protocols established within a community. For example, participation in the community may include payment for use of shared resources or a limit on such usage. In these instances, system 200 may terminate pooling if payment is not made or a usage limit exceeded.

The analytics module may also map and profile service areas and monitoring growth of devices and usage rates over time. Mapping may also be used to analyze the drop off or addition of devices as the physically move to identify an egress point or other boundary. In one example, device capability or usage may vary with location, and accordingly, the level of sharing needed to deliver the capability or usage may vary. For example, a convention may pool devices to provide enhanced display capability and joint participation from attendees at the conference. Devices leaving the convention may roll off of the shared pool because the enhanced display capability is no longer required, or may transition to another capability when multiple zones within a convention are present.

The analytics module may also assess the capability, availability, quality of service or other metrics based on before a device was added and after a device was added to assess compatibility of resources, viability of connection, and optimize the distribution of resources among disparate devices. The analytics module may identify usage trends that may be used to send an alert signal to customer device 228 when edge device level upgrades or service expansion is needed. The same trends may be applied on a macro level to assess the need to partition, scale up or down resources to address the trends on a temporary or more permanent basis.

Figure 2B:
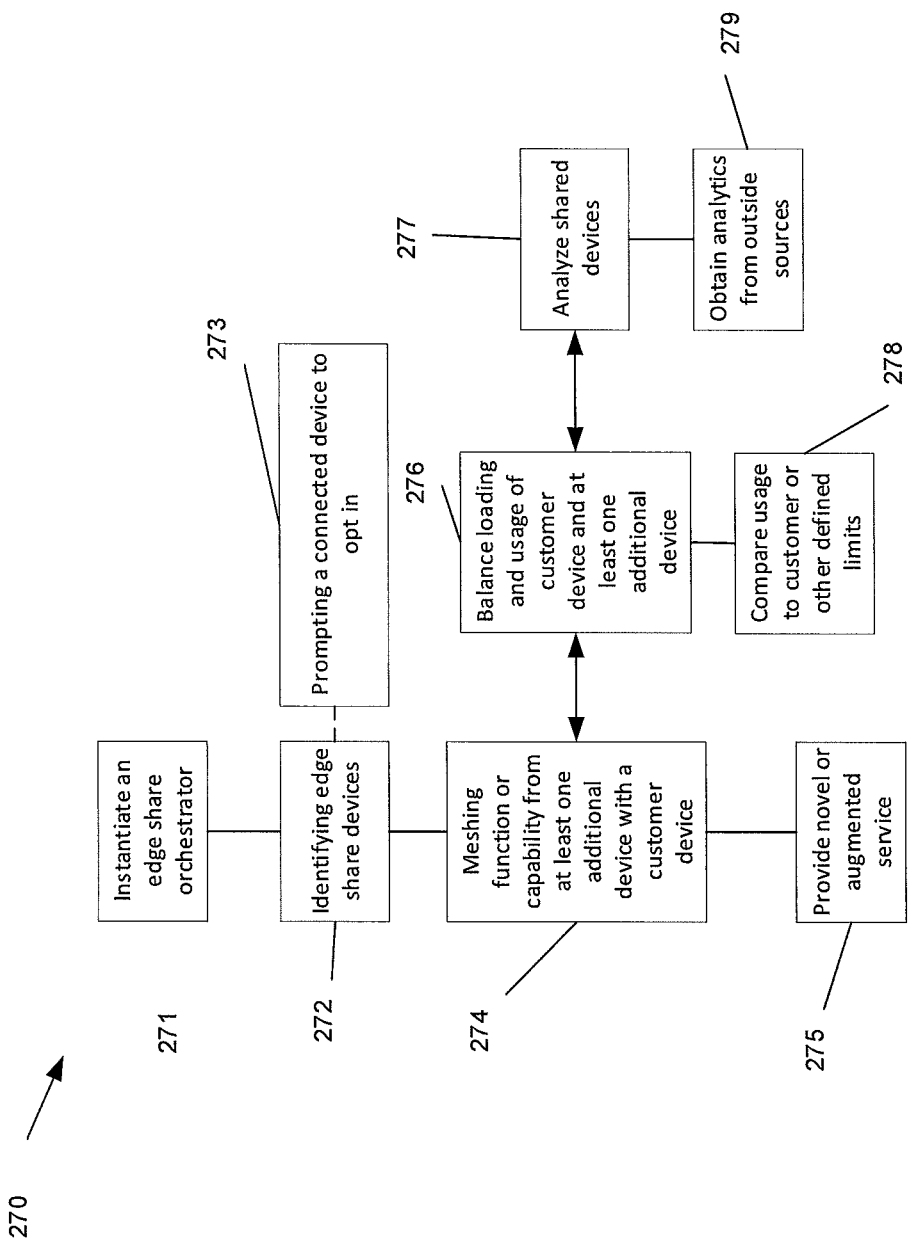
FIG. 2B is a flow diagram depicting system operations according to an example.

With reference to FIG. 2B, a diagram showing operation of system 200 according to one example is shown. System 200 may be implemented in as a component, network device or virtual network function to perform operations, generally indicated by the number 270, including but not limited to instantiating an edge share orchestrator at step 271. This step may include instantiating inventory device 220, an edge load balancer 230 and analytics module 240 described above. At step 272, system 200 identifies and registers connected devices 225. Optionally, at step 273, as part of the registration process, system may prompt a connected device for an opt in signal to complete registration of the device. This may be used to provide the customer with more control over the devices that are available for pooled use. This step may also be used to allow third parties a choice to add their device(s) to a pool.

Once the devices are identified and registered, edge share orchestrator meshes at least one capability or function at step 274. This step includes pooling a customer device with at least one additional connected device. As described above, the additional device may include but is not limited to a legacy customer device, a service provider device or third-party device, such as a community device. By meshing at least one capability or function, edge share orchestrator provides at least on novel or augmented service 250 at step 275.

The step of meshing 273 may also include balancing loading and usage of the customer device and the at least one additional device at step 276. Optionally, edge share orchestrator 210 may analyze the shared devices at step 277 to monitor performance, identify additional capability or function, and identify trends within the usage as described more completely above. The step of balancing 276 may also include comparing usage of resources to customer defined or other limits, quality of service standards, and the like to ensure usage complies with these limits. Optionally, this step may include delivering a usage alert to a customer via an input/output device based on usage at or near a defined limit or threshold. The step of analyzing may including pulling in analytics from outside source at step 279 including but not limited to those obtained from a community service orchestrator.

Figure 3:
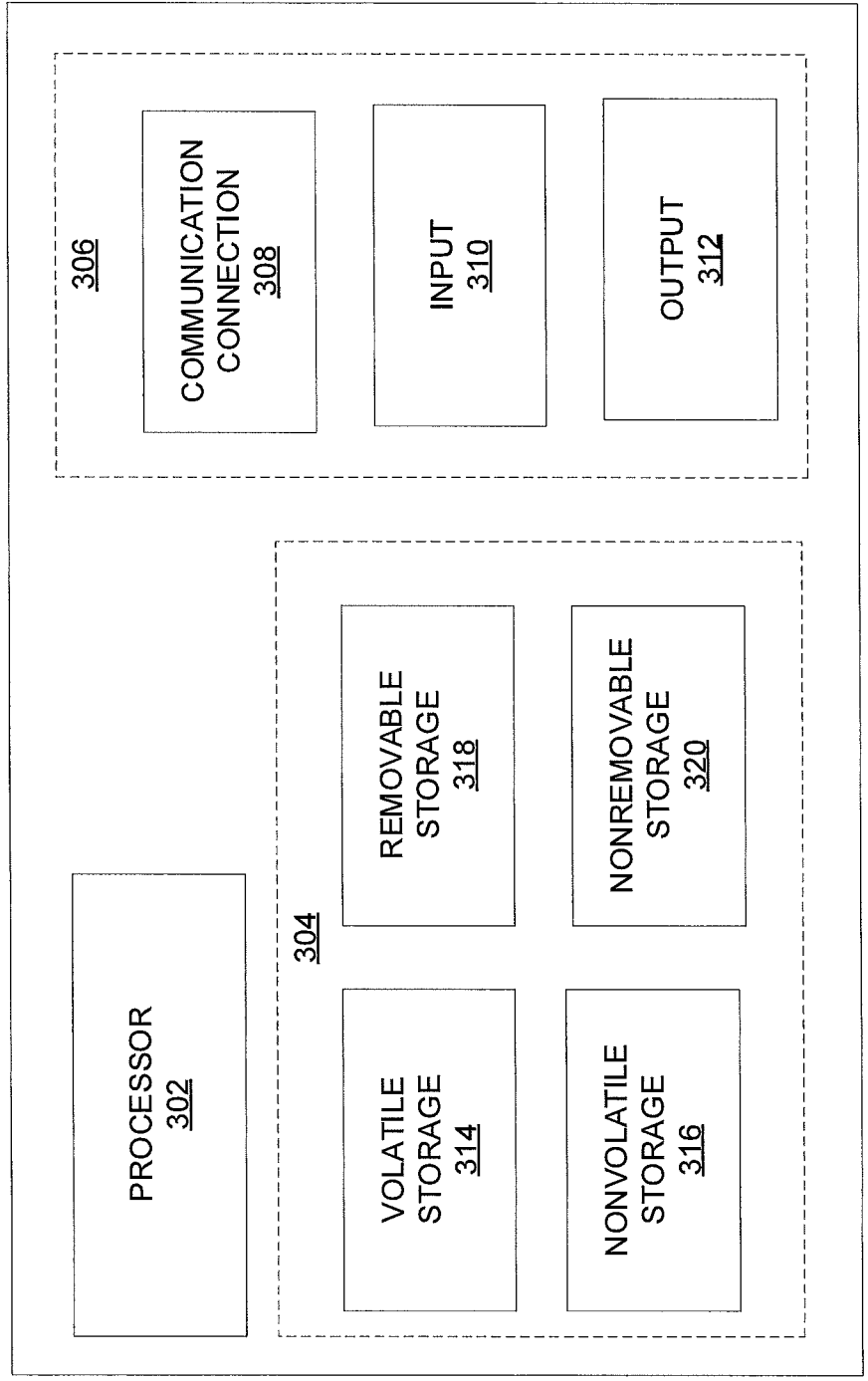
FIG. 3 is a representation of a network device according to an example.

FIG. 3. illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Edge share system 200 may reside within any network to facilitate communication between edge routers from disparate network families and services. The following are example networks on which system 200 may reside. For purposes of centrality, system 200 may reside within a core network shown in the various examples below. However, it will be understood that system 200 may reside on any network edge router or peer to peer network device providing the same function in connection with customer VRFs including but not limited to telecommunications networks, internet, and other networks described more completely below.

Figure 4:
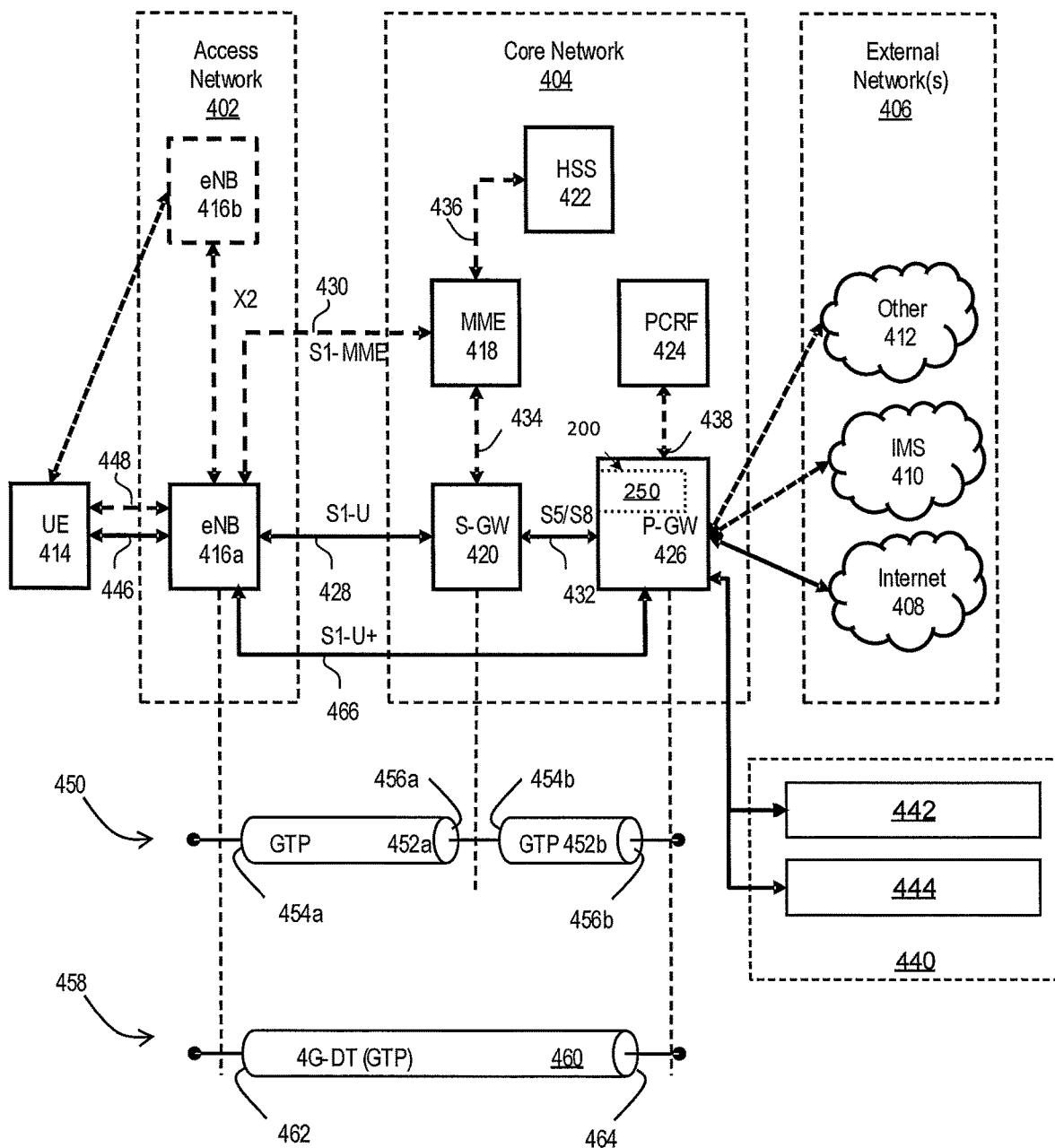
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches, and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address, and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. For example, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 1B:
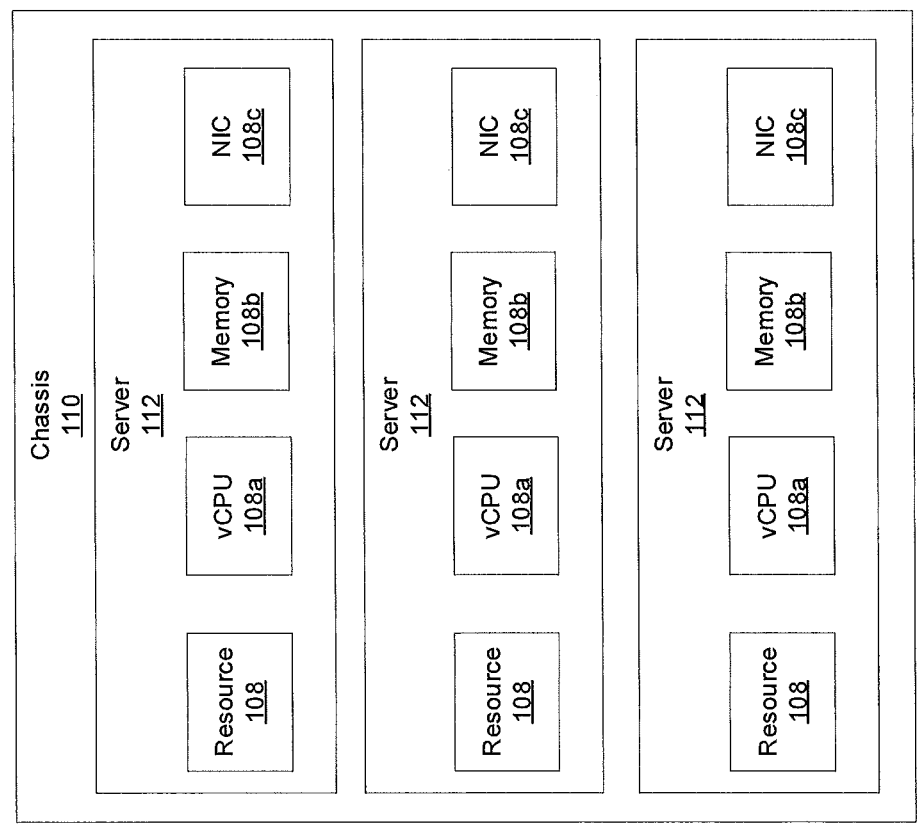
Figure 5:
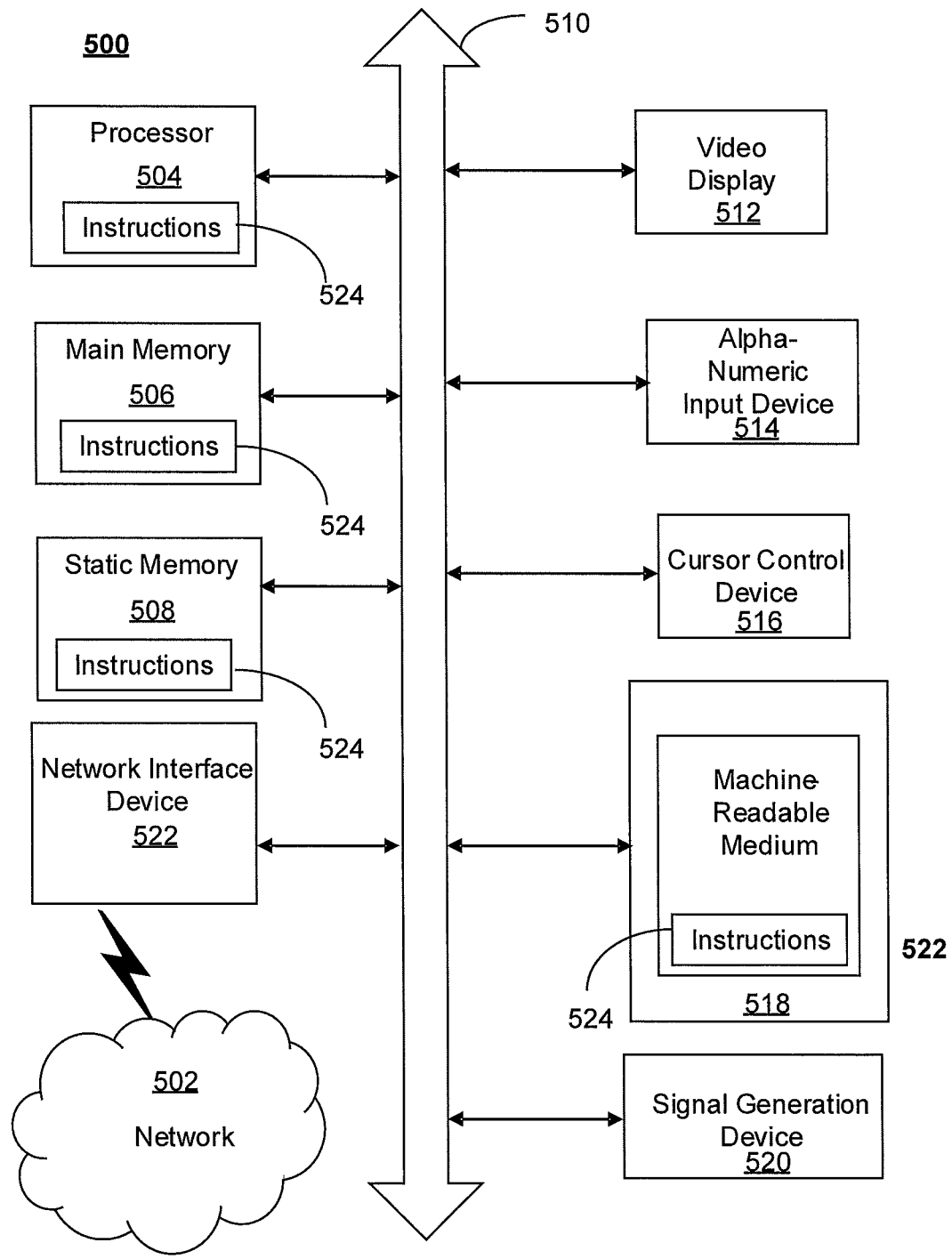
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video, or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 519 on which is stored one or more sets of instructions (e.g., software 524) embodying any one or more of the methods or functions described herein, including those methods illustrated above. Instructions 524 may also reside, completely or at least partially, within main memory 506, static memory 508, or within processor 504 during execution thereof by the computer system 500. Main memory 506 and processor 504 also may constitute tangible computer-readable storage media.

Figure 6:
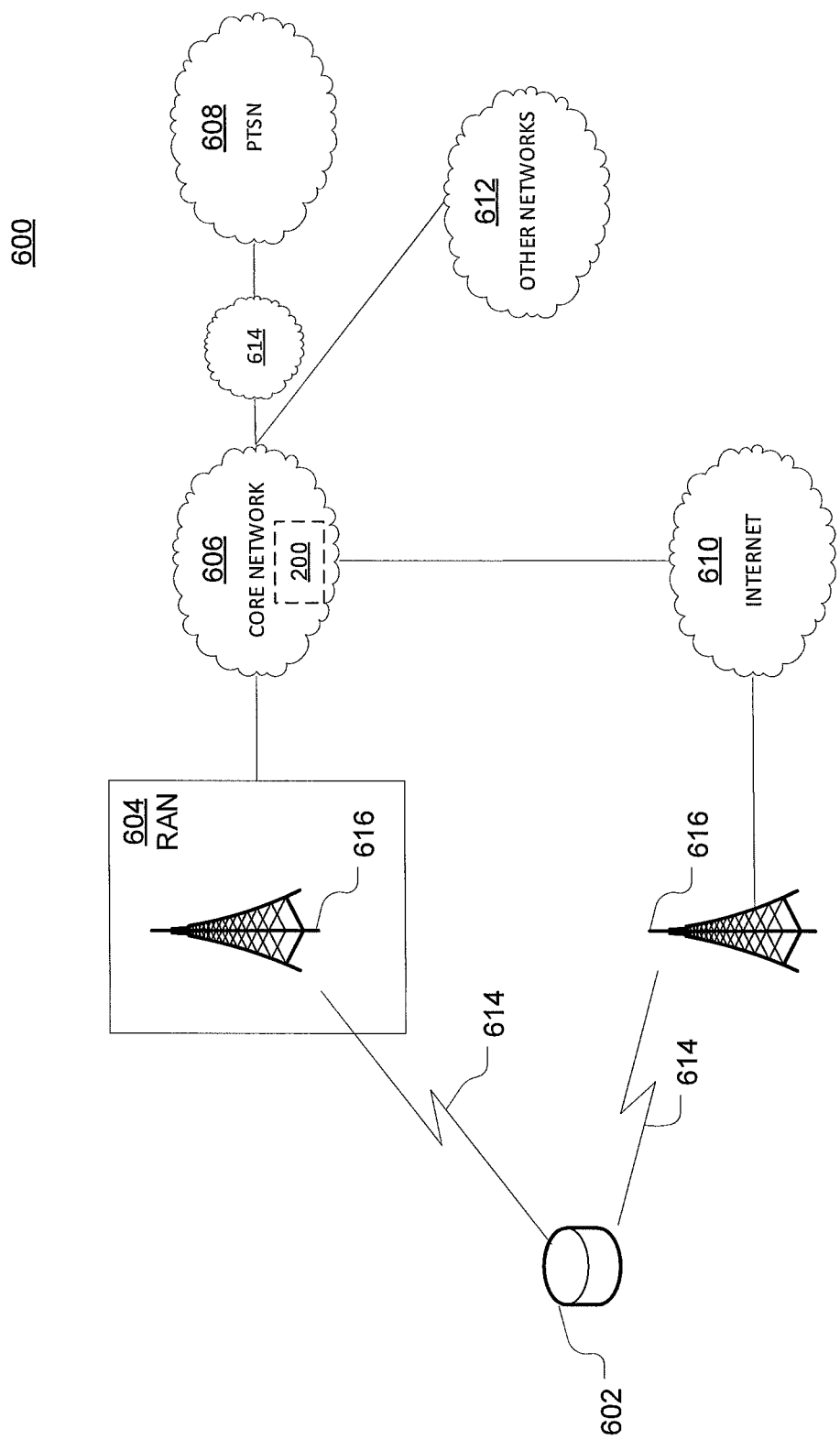
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNodeB, a Home Node B, a Home eNodeB, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNodeB, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
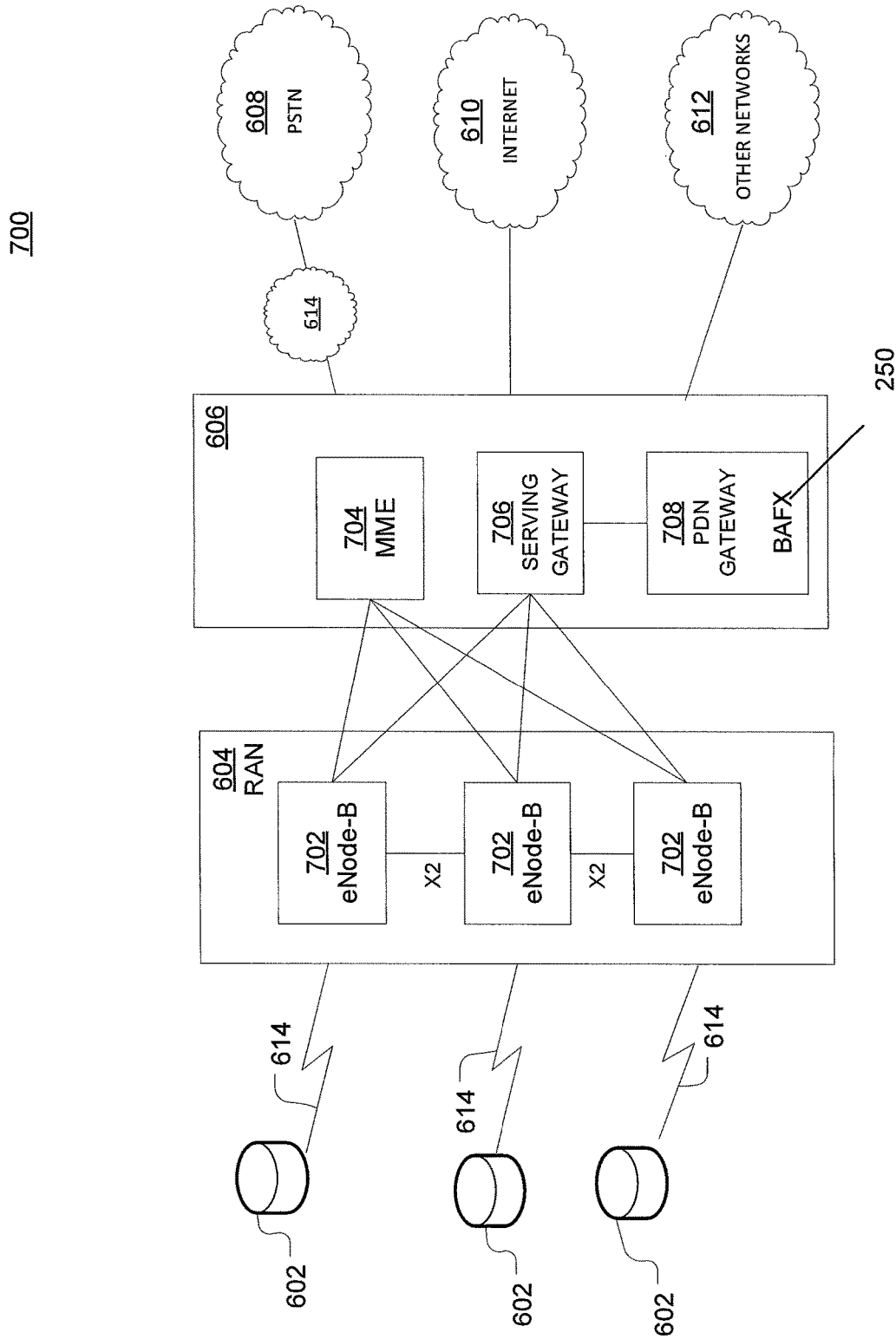
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNodeBs 702 while remaining consistent with the disclosed technology. One or more eNodeBs 702 may include one or more transceivers for communicating with the WTRUs 602 over air interface 614. Optionally, eNodeBs 702 may implement MIMO technology. Thus, one of eNodeBs 702, for example, may use multiple antennas to transmit wireless signals to, or receive wireless signals from, one of WTRUs 602.

Each of eNodeBs 702 may be associated with a particular cell and may be configured to handle radio resource management decisions, handover decisions, scheduling of users in the uplink or downlink, or the like. As shown in FIG. 7 eNodeBs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNodeBs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNodeBs 702 in RAN 604 via the S1 interface. Serving gateway 706 may generally route or forward user data packets to or from the WTRUs 602. Serving gateway 706 may also perform other functions, such as anchoring user planes during inter-eNodeB handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
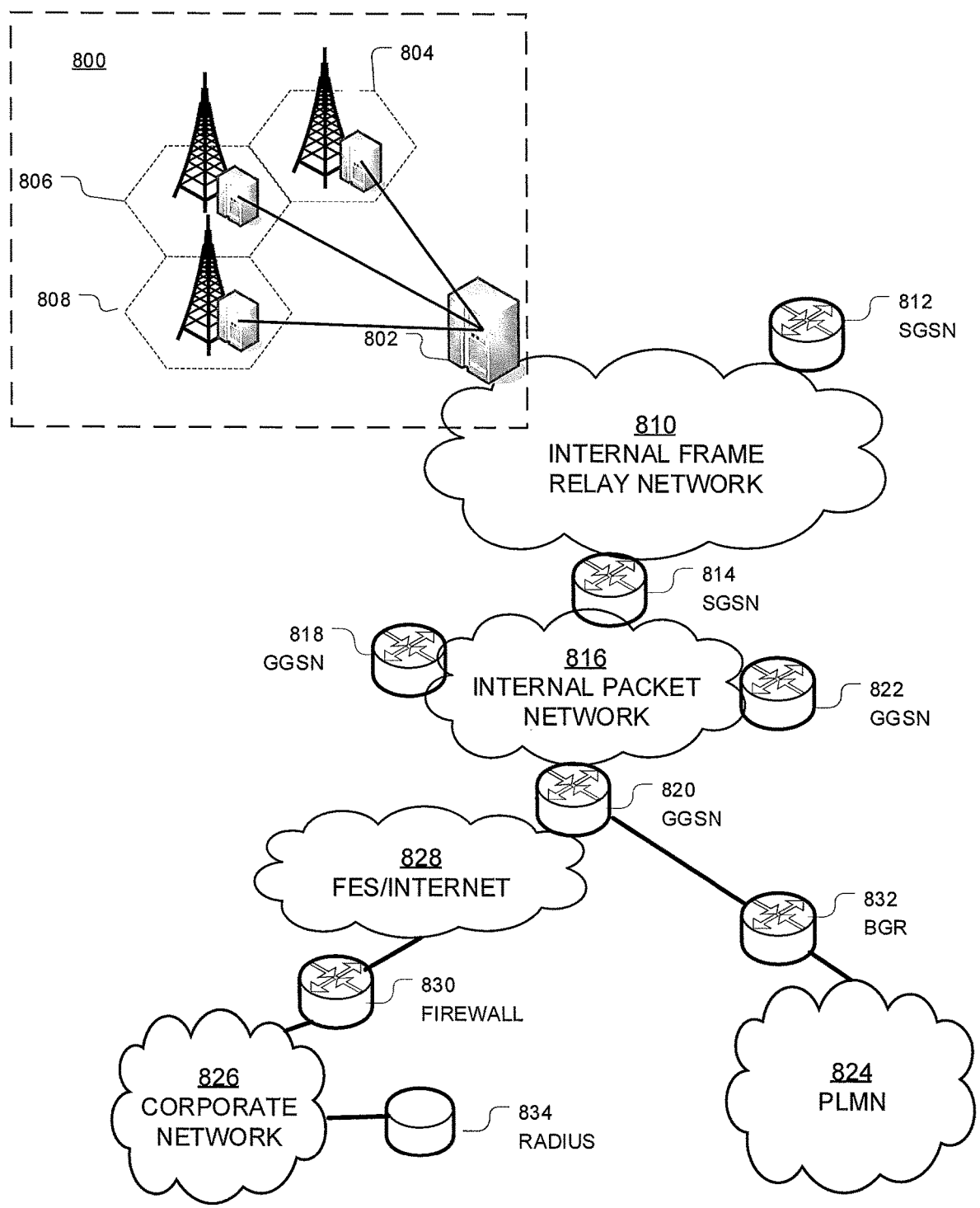
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
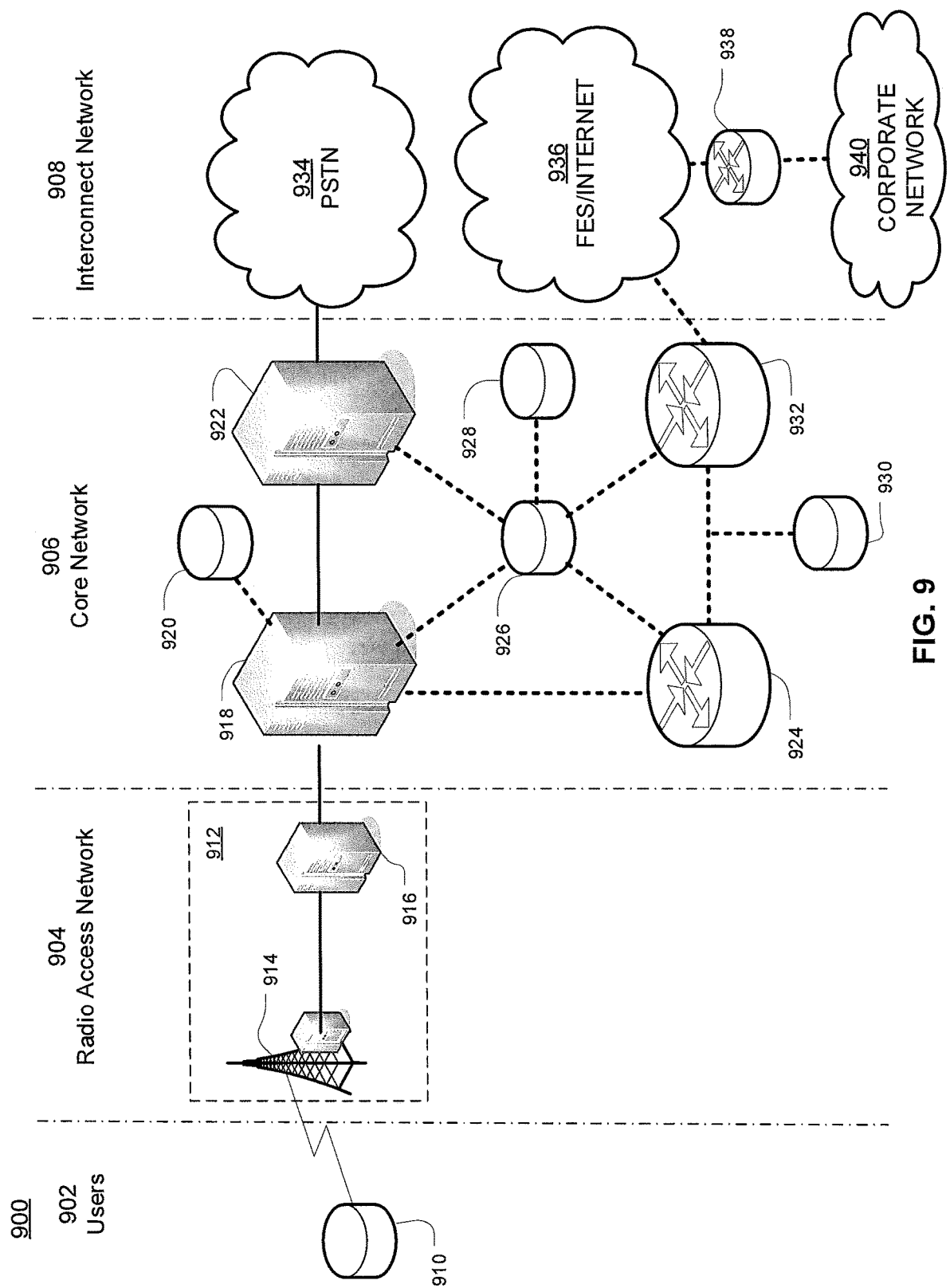
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, a FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
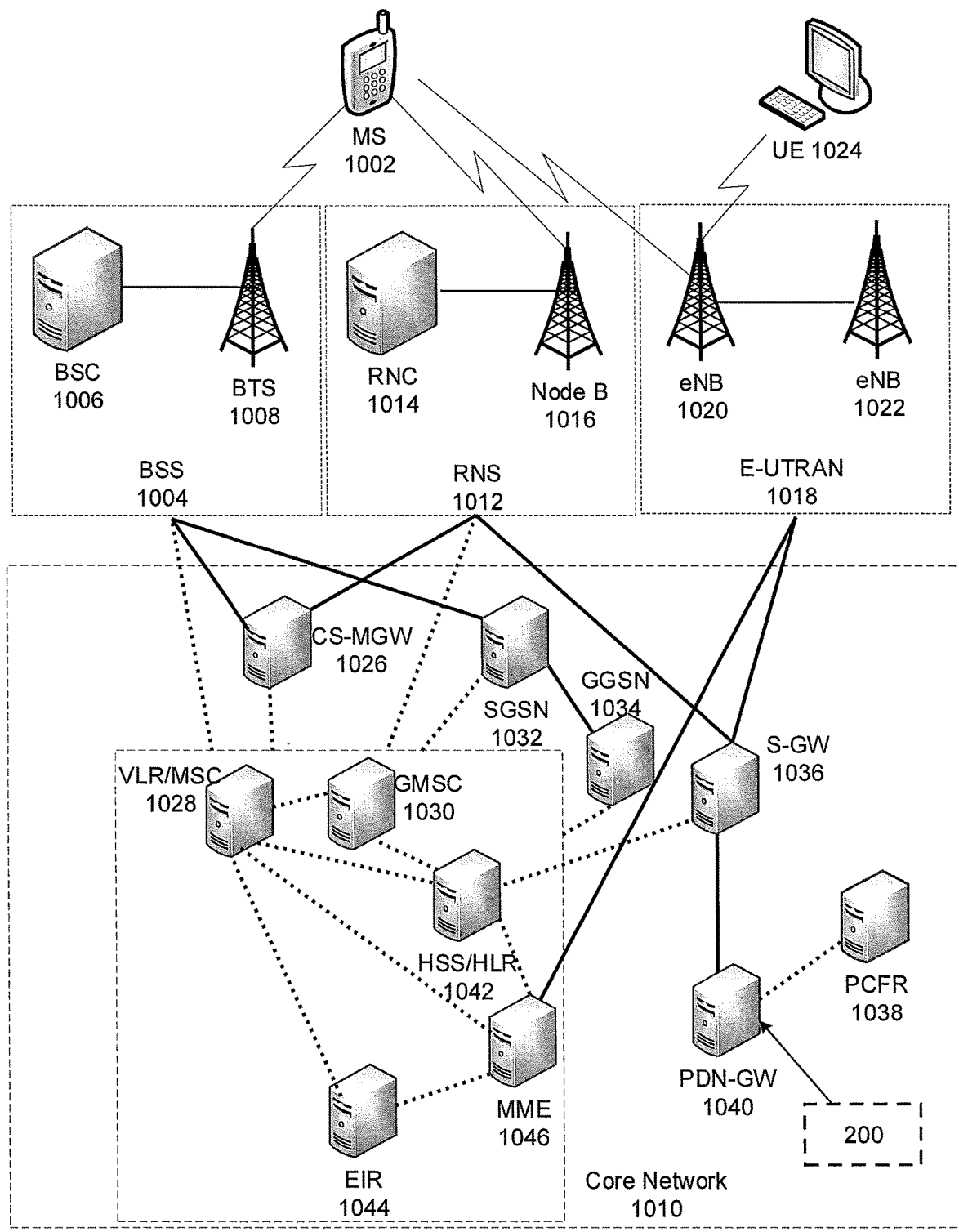
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed, or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. An MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "blacklisted" depending on its status in the network. If MS 1002 is stolen and put to use by an unauthorized user, it may be registered as "blacklisted" in EIR 1044, preventing its use on the network. An MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which edge devices may be orchestrated have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1

An edge share orchestration system comprising: an opportunistic capability listener in communication with at least one customer device and at least one additional device; the opportunistic capability listener is configured to pool the at least one customer device and the at least one additional device based on at least one of a capability and a function; an edge share balancer configured to integrate the at least one customer device with the at least one additional device to transform the capability or function of the at least one customer device to provide at least one of a novel service and an augmented service.

Example 2

The system of example 1, wherein the edge share balancer transforms the capability of the at least one customer device by adding at least one of a compute power, a sensor, a display capacity, and an input/output device from the at least one additional device.

Example 3

The system of example 1, wherein the at least one additional device includes an idle device.

Example 4

The system of example 1, wherein the edge share balancer includes a reciprocal share weighting module in communication with the at least one customer device and configured to receive a share limit signal from the at least one customer device indicating at least one of a limit level of sharing and an amount of use of the at least one customer device.

Example 5

The system of example 1, wherein the edge share balancer includes a fault/deprecation balancer configured to monitor the interaction between the at least one customer device and the at least one additional device.

Example 6

The system of example 1, wherein the at least one additional device includes at least one resource including at least one of a compute power, a display, an input/output device, and a memory; and wherein the edge share balancer is configured to pool or partition the at least one resource.

Example 7

The system of example 1 further comprising a selective addition module, the selective addition module including an input/output device that communicates with the at least one customer device and the at least one additional device, and is configured to prompt the at least one customer device and the at least one additional device for an opt in signal; wherein upon receiving an opt in signal, the at least one customer device or at least one additional device are connected to the edge share orchestrator.

Example 8

The system of example 1, wherein the opportunistic capability listener is a virtual function instantiated on at least one of a peer to peer device, a service provider gateway, and an edge router.

Example 9

The system of example 1, wherein the edge share balancer is a virtual network function instantiated on a service provider orchestrator.

Example 10

The system of example 1, wherein the edge share orchestrator communicates with at least one community service orchestrator and, wherein the additional device is a community device connected via the community service orchestrator.

Example 11

A network device comprising: a processor, an input/output device coupled to the processor, and a memory coupled with the processor, the memory comprising executable instructions that when executed by the processor cause the processor to effectuate operations comprising instantiating an edge share orchestrator; identifying connected devices including a customer device and at least one additional device and registering the connected devices with the edge share orchestrator; meshing at least one of a capability or function of the customer device and the additional device; and providing a novel or augmented service.

Example 12

The network device of example 11, wherein the meshing operation includes balancing a loading of the customer device and the at least one additional device.

Example 13

The network device of example 11, wherein the operations further comprise analyzing the performance of the customer device and the at least one additional device in the context of the novel or augmented service.

Example 14

The network device of example 11 further comprising the operation of obtaining analytics from a community edge share orchestrator.

Example 15

The network device of example 11, wherein the at least one additional device includes at least one of a legacy customer device, a community device, and a service provider device.

Example 16

The network device of example 11, wherein the step of registering the connected devices with the edge share orchestrator includes prompting each device for an opt-in signal.

Example 17

A method of edge share orchestration comprising the steps of identifying plural connected devices in a network with a customer device; registering the plural connected devices with an edge share orchestrator; meshing at least one capability or function of the connected devices with the customer device to provide a novel or augmented service to the customer device.

Example 18

The method of example 17, wherein the connected devices are connected to the customer device by a router at a location.

Example 19

The method of example 17 further comprising defining a usage threshold for at least one of the customer device and the plural connected devices and comparing a usage for the novel or augmented service to the threshold.

Example 20

The method of example 19 further comprising rebalancing the meshing upon reaching or exceeding the threshold.

The invention claimed is:

1. A device comprising:
a processor; and
a memory coupled with the processor, the memory comprising executable instructions that when executed by the processor cause the processor to effectuate operations comprising:
   instantiating an edge share orchestrator, wherein the edge share orchestrator effectuates operations comprising:
   identifying edge devices, wherein the edge devices comprise a customer device;
   determining that the customer device lacks computing power or functionality to perform at least a portion of an existing or augmented service;
   identifying at least one additional device of the edge devices capable of providing additional computing power or functionality for performing the at least a portion of the existing service or augmented service associated with the customer device;
   meshing the additional computing power or functionality of the at least one additional device with the customer device; and
   performing the at least a portion of the existing or augmented service associated with the customer device using the meshed additional computing power or functionality of the at least one additional device and the customer device.

2. The device of claim 1, the operations further comprising registering the edge devices with the edge share orchestrator, wherein registering the edge devices with the edge share orchestrator comprises prompting each device of the edge devices for an opt-in signal.

3. The device of claim 2, wherein an opt-in signal is used to add third party devices to a sharing pool comprising the edge devices.

4. The device of claim 2, wherein an opt-out signal is used to remove a device from a sharing pool comprising the edge devices.

5. The device of claim 1, wherein the existing or augmented service associated with the customer device addresses damage to the customer device and loss of performance for the customer device.

6. The device of claim 1, wherein the existing or augmented service associated with the customer device normalizes quality of service for the customer device and a temporary deficiency caused by a use of resources of the customer device for another task.

7. The device of claim 1, wherein the at least one additional device provides the additional computing power or functionality when the at least one additional device is idle.

8. A method comprising:
   identifying, by a processor, edge devices, wherein the edge devices comprise a customer device;
   determining, by the processor, that the customer device lacks computing power or functionality to perform at least a portion of an existing service or augmented service;
   identifying, by the processor, at least one additional device of the edge devices capable of providing additional computing power or functionality for performing the at least a portion of the existing service or augmented service associated with the customer device;
   meshing, by the processor, the additional computing power or functionality of the at least one additional device with the customer device; and
   performing, by the processor, the at least a portion of the existing service or augmented service associated with the customer device using the meshed additional computing power or functionality of the at least one additional device and the customer device.

9. The method of claim 8 further comprising registering the edge devices with an edge share orchestrator, wherein registering the edge devices with the edge share orchestrator comprises prompting each device of the edge devices for an opt-in signal.

10. The method of claim 9, wherein an opt-in signal is used to add third party devices to a sharing pool comprising the edge devices.

11. The method of claim 9, wherein an opt-out signal is used to remove a device from a sharing pool comprising the edge devices.

12. The method of claim 8, wherein the existing service or augmented service associated with the customer device addresses damage to the customer device and loss of performance for the customer device.

13. The method of claim 8, wherein the existing service or augmented service associated with the customer device normalizes quality of service for the customer device and a temporary deficiency caused by a use of resources of the customer device for another task.

14. The method of claim 8, wherein the at least one additional device provides the additional computing power or functionality when the at least one additional device is idle.

15. A system comprising:
   one or more processors; and
   memory coupled with the one or more processors, the memory comprising executable instructions that when executed by the one or more processors cause the one or more processors to effectuate operations comprising:
      identifying edge devices, wherein the edge devices comprise a customer device;
      determining that the customer device lacks computing power or functionality to perform at least a portion of an existing service or augmented service;
      identifying at least one additional device of the edge devices capable of providing additional computing power or functionality for performing the at least a portion of the existing service or augmented service associated with the customer device;
      meshing the additional computing power or functionality of the at least one additional device with the customer device; and
      performing the at least a portion of the existing service or augmented service associated with the customer device using the meshed additional computing power or functionality of the at least one additional device and the customer device.

16. The system of claim 15 further comprising registering the edge devices with an edge share orchestrator, wherein registering the edge devices with the edge share orchestrator comprises prompting each device of the edge devices for an opt-in signal.

17. The system of claim 16, wherein an opt-in signal is used to add third party devices to a sharing pool comprising the edge devices.

18. The system of claim 16, wherein an opt-out signal is used to remove a device from a sharing pool comprising the edge devices.

19. The system of claim 15, wherein the existing service or augmented service associated with the customer device addresses damage to the customer device and loss of performance for the customer device.

20. The system of claim 15, wherein the existing service or augmented service associated with the customer device normalizes quality of service for the customer device and a temporary deficiency caused by a use of resources of the customer device for another task.

\* \* \* \* \*